United States Patent
Chung et al.

(10) Patent No.: US 11,644,905 B2
(45) Date of Patent: May 9, 2023

(54) ELECTRONIC DEVICE AND KEYBOARD MODULE THEREOF

(71) Applicant: ASUSTEK COMPUTER INC., Taipei (TW)

(72) Inventors: Chung-Jen Chung, Taipei (TW); Sheng-Ta Lin, Taipei (TW); Chin-Chung Lai, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/474,870

(22) Filed: Sep. 14, 2021

(65) Prior Publication Data

US 2022/0083152 A1 Mar. 17, 2022

(30) Foreign Application Priority Data

Sep. 17, 2020 (TW) ................. 109132040

(51) Int. Cl.
*G06F 3/02* (2006.01)
*H01H 13/86* (2006.01)
*H01H 13/7065* (2006.01)

(52) U.S. Cl.
CPC ....... *G06F 3/0216* (2013.01); *H01H 13/7065* (2013.01); *H01H 13/86* (2013.01)

(58) Field of Classification Search
CPC .... H01H 13/7065; H01H 13/70; H01H 13/86; H01H 2221/022; H06F 3/0202; G06F 3/0216; G06F 3/033; G06F 3/02; G09G 5/08

See application file for complete search history.

(56) References Cited

U.S. PATENT DOCUMENTS

| | | | | |
|---|---|---|---|---|
| 5,486,059 A | * | 1/1996 | Iwasa | H01H 13/84 708/142 |
| 2004/0069600 A1 | * | 4/2004 | Xie | G06F 3/0233 200/5 R |
| 2007/0285872 A1 | * | 12/2007 | Jeong | H03K 17/962 361/272 |
| 2008/0138136 A1 | * | 6/2008 | Sauvage | G06F 3/0216 400/488 |
| 2014/0340208 A1 | | 11/2014 | Tan et al. | |

(Continued)

FOREIGN PATENT DOCUMENTS

CN 201946470 U 8/2011
CN 203658948 U 6/2014

(Continued)

*Primary Examiner* — Pegeman Karimi
(74) *Attorney, Agent, or Firm* — Muncy, Geissler, Olds & Lowe, P.C.

(57) ABSTRACT

A keyboard module, adapted to an electronic device, is provided. The keyboard module includes a bottom plate, a flexible circuit layer, a first key structure and a second key structure. The bottom plate includes a first area and a second area. The flexible circuit layer covers the first area and the second area. A first key structure is arranged at the position of the flexible circuit layer corresponding to the first area. A second key structure is arranged at the position of the flexible circuit layer corresponding to the second area. The height of the first key structure is greater than the height of the second key structure. An electronic device with the keyboard module is also provided.

9 Claims, 4 Drawing Sheets

(56) References Cited

U.S. PATENT DOCUMENTS

2019/0019639 A1\* 1/2019 Lane ................ H01H 13/85
2020/0043681 A1\* 2/2020 Chen ................ H01H 13/83
2020/0113040 A1   4/2020 Chen et al.

FOREIGN PATENT DOCUMENTS

| CN | 203674033 U | 6/2014 |
| CN | 210155633 U | 3/2020 |
| TW | 201506686 A | 2/2015 |
| TW | M528464 U | 9/2016 |
| TW | I665585 B | 7/2019 |
| TW | I680384 B | 12/2019 |
| TW | I681431 B | 1/2020 |

\* cited by examiner

ELECTRONIC DEVICE AND KEYBOARD MODULE THEREOF

CROSS-REFERENCE TO RELATED APPLICATION

This application claims the priority benefit of Taiwan application serial No. 109132040, filed on Sep. 17, 2020. The entirety of the above-mentioned patent application is hereby incorporated by reference herein and made a part of the specification.

BACKGROUND OF THE INVENTION

Field of the Invention

The invention relates to an electronic device and, more particularly, to a keyboard module of an electronic device.

Description of the Related Art

As notebook computers get thinner and lighter, the internal space of the computer host becomes more restricted. To satisfy the light and thin requirements, notebook computers usually cut down some connecting ports, or decrease the size of the keyboard to make space for the connecting ports. However, all the implementations above are inconvenient to use.

BRIEF SUMMARY OF THE INVENTION

A keyboard module, adapted for an electronic device, is provided. The electronic device includes a connecting port. The keyboard module includes a bottom plate, a flexible circuit layer, a first key structure, and a second key structure. The bottom plate includes a first area and a second area. The flexible circuit layer covers the first area and the second area.

The first key structure is arranged at the position of the flexible circuit layer corresponding to the first area. The second key structure is arranged at the position of the flexible circuit layer corresponding to the second area. The height of the first key structure is greater than the height of the second key structure.

An electronic device is also provided. The electronic device includes a keyboard module and a connecting port. The keyboard module includes a bottom plate, a flexible circuit layer, a first key structure, and a second key structure. The bottom plate includes a first area and a second area, and an accommodating space is formed under the second area. The flexible circuit layer covers the first area and the second area. The first key structure is arranged at the position of the flexible circuit layer corresponding to the first area. The second key structure is arranged at the position of the flexible circuit layer corresponding to the second area, the height of the first key structure is greater than the height of the second key structure. The connecting port is set in the accommodating space.

The keyboard module provided herein includes a second area, and an accommodating space is formed under the second area to accommodate the connecting ports of the electronic device or other parts. In this way, the internal space of the electronic device is effectively used. In addition, by stacking high-height parts such as the connecting ports under the keyboard module 100, it helps the electronic device to be thinner and lighter, while ensuring the size of the keyboard for convenience.

DETAILED DESCRIPTION OF THE EMBODIMENTS

The embodiments of the present disclosure are disclosed in the following drawings, and for more clarity, the details of the disclosure will be described hereinafter. According to the following description and the claims, the advantages and features of this application will be clearer. It should be noted that the drawings are in a very simplified form and all use imprecise proportions, which are only used to conveniently and clearly assist in explaining the purpose of the embodiments.

Figure 1:
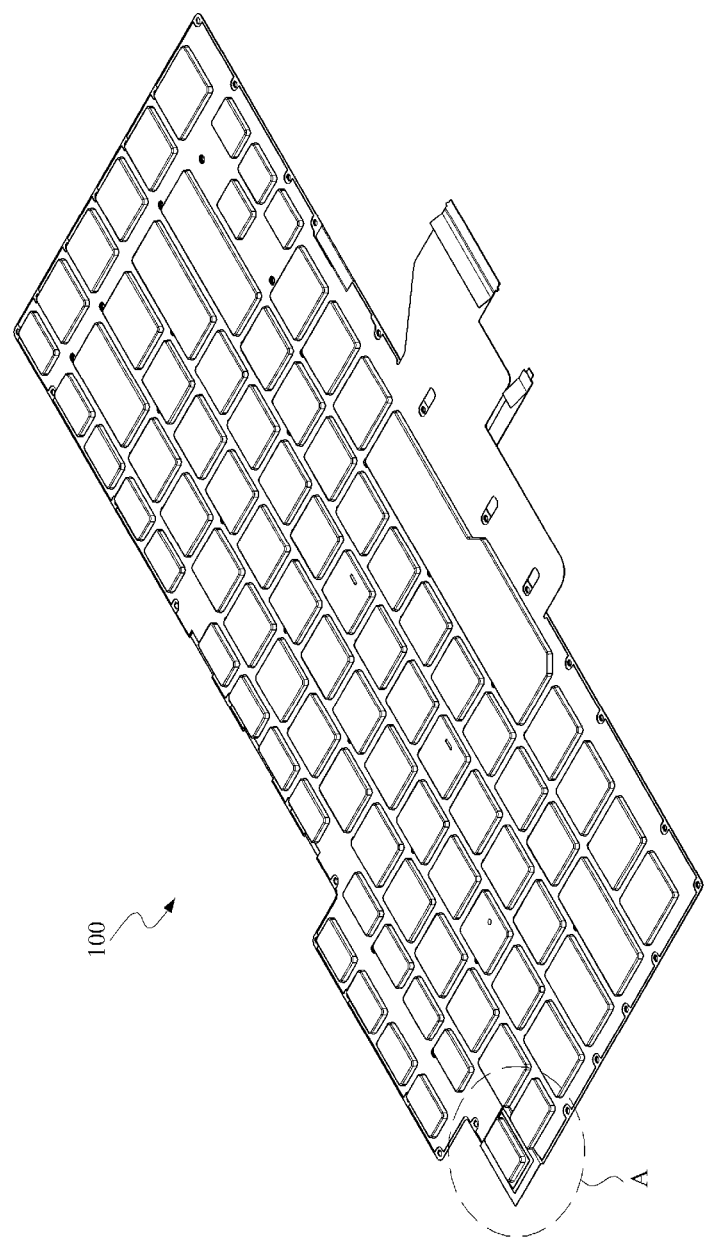
FIG. 1 is a three-dimensional schematic diagram of a keyboard module in an embodiment.
Figure 2:
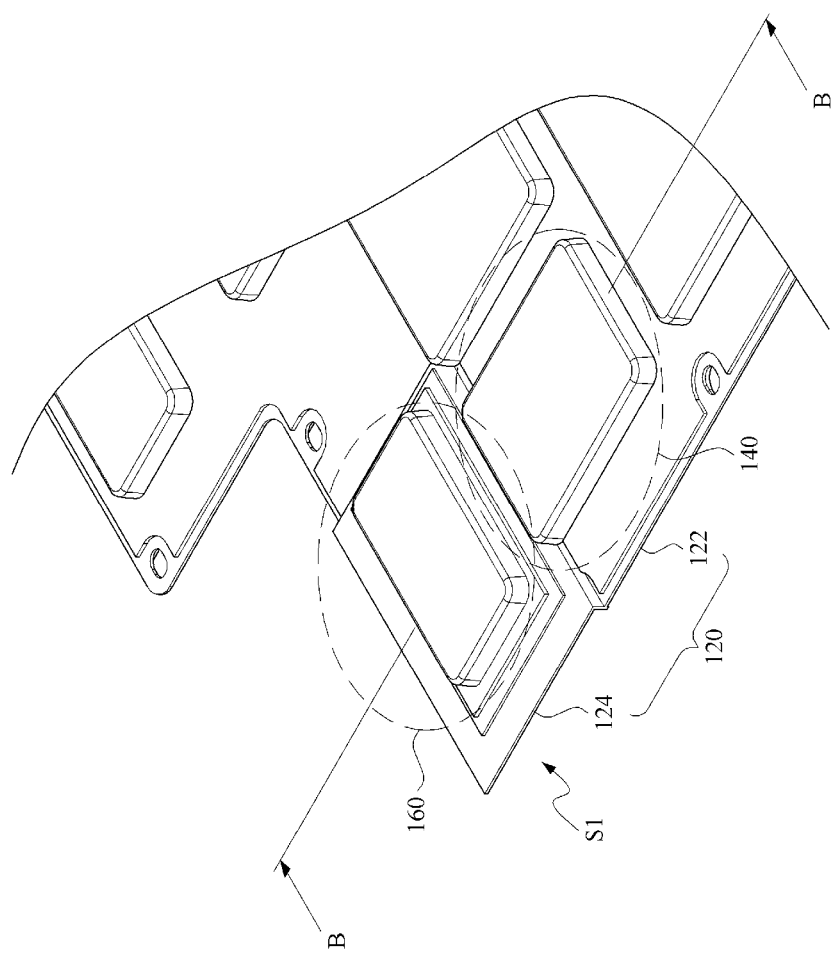
FIG. 2 is an enlarged schematic diagram of an area A of FIG. 1.

FIG. 1 is a three-dimensional schematic diagram of a keyboard module 100 in an embodiment. FIG. 2 is an enlarged schematic diagram of an area A of FIG. 1. The keyboard module is suitable for electronic devices with the key input function such as notebook computers.

As shown in FIG. 2 and FIG. 1, the keyboard module 100 includes a bottom plate 120, a first key structure 140, and a second key structure 160. The bottom plate 120 includes a first area and a second area. In one embodiment, the first area and the second area are a planar area 122 and a convex area 124, respectively, which is not limited herein. In one embodiment, the first area and the second area are a concave area and a planar area, respectively, or other types with height differences.

The first key structure 140 is arranged in the planar area 122. The second key structure 160 is arranged in the convex area 124. An accommodating space Si is formed under the convex area 124 of the bottom plate 120 to accommodate a connecting ports or other parts with high height. In one embodiment, the convex area 124 is arranged at the edge of the bottom plate 120 corresponding to the position of the connecting port.

Figure 3:
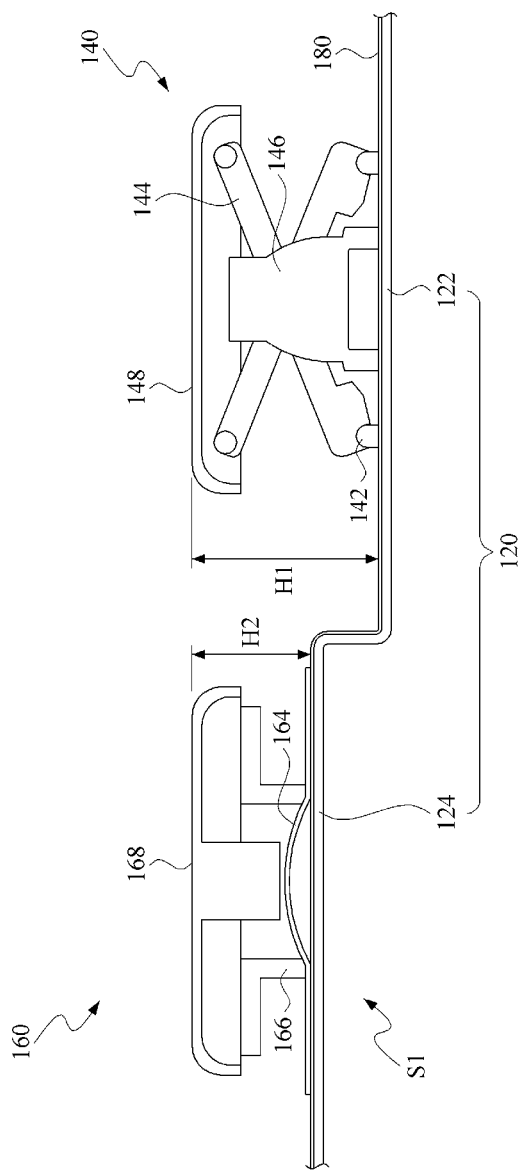
FIG. 3 is a schematic cross-sectional view corresponding to the section B-B of FIG. 2.

Please refer to FIG. 3 together. FIG. 3 is a schematic cross-sectional view corresponding to the section B-B of FIG. 2. As shown, the original height H1 of the first key structure 140 in the planar area 122 is greater than the original height H2 of the second key structure 160 in the convex area 124. In this way, before being pressed, the keycap surfaces of the first key structure 140 and the second key structure 160 are at the same horizontal plane.

In one embodiment, in accordance with the height restrictions of the first key structure 140 and the second key structure 160, the first key structure 140 is a key structure with a relatively large key travel, such as a scissor structure, and the second key structure is a key structure with a relatively small key travel, such as a metal dome structure, a membrane structure, and so on.

The upper surface of the bottom plate 120 includes a flexible circuit layer 180. The flexible circuit layer 180 covers the planar area 122 and the convex area 124 along the surface of the bottom plate 120. The first key structure 140 is arranged at the flexible circuit layer 180 corresponding to the position of the planar area 122, and the second key structure 160 is arranged at the flexible circuit layer 180 corresponding to the position of the convex area 124. The flexible circuit layer 180 generates pressing signals corresponding to the first key structure 140 and the second key structure 160, which is not limited herein.

In one embodiment, a plurality of flexible circuit layers (not shown) are arranged on the bottom plate 120 to respectively cover the planar area 122 and the convex area 124, so as to generate pressing signal corresponding to the first key structure 140 and the second key structure 160.

In one embodiment, the first key structure 140 provided in the planar area 122 and the second key structure 160 provided in the convex area 124 are different types of key structures to meet the restrictions of different structure heights. For example, as shown, the first key structure 140 is a scissor switch with better pressing feel and relatively large key travel, and the second key structure 160 is a metal dome switch with smaller height and key travel.

Taking the scissor switch shown in the figure as an example, the first key structure 140 includes a base 142, a scissor structure 144, an elastic element 146, and a first keycap 148. The base 142 is arranged on the bottom plate 120. The scissor structure 144 is connected to the base 142 and the first keycap 148, and the elastic element 146 is located between the flexible circuit layer 180 and the first keycap 148. When the first keycap 148 is pressed and moved downward, it pushes the elastic element 146 to trigger the flexible circuit layer 180 to generate a pressing signal.

Taking the metal dome switch shown in the figure as an example, the second key structure 160 includes a metal dome 164, a spacer layer 166, and a second keycap 168. The metal dome 164 is disposed on the flexible circuit layer 180, and the spacer layer 166 is located between the metal dome 164 and the second keycap 168 as a spacer structure. The spacer layer 166 is a rubber pad. When the second keycap 168 is pressed and moved downward, the metal dome 164 contacts the flexible circuit layer 180 to generate a pressing signal.

In one embodiment, in order to simplify the structure, the base 142 of the first key structure 140 and the bottom plate 120 are integrally formed. In other words, the bottom plate 120 and the base 142 of the first key structure 140 are formed on the same metal sheet. In one embodiment, the metal dome 164 of the second key structure 160 and the bottom plate 120 are integrally formed, and the flexible circuit layer is further arranged under the metal dome 164 to generate the pressing signal. That is, the bottom plate 120 and the metal dome 164 of the second key structure 160 are formed on a same metal sheet.

Furthermore, in one embodiment, the bottom plate 120, the base 142 of the first key structure 140, and the metal dome 164 of the second key structure 160 are integrally formed. In other words, the bottom plate 120, the base 142, and the metal dome 164 are formed on the same metal sheet. The description of the scissor switch and the metal dome switch is only an example, which is not limited herein. Other scissor switch and the metal dome switch, as well as other types of keys, are also applied to the keyboard module in the embodiment.

The embodiments mentioned above use different types of the first key structure 140 and the second key structure 160 to provide different structural heights, which keeps the surface of the keycap of the first key structure 140 and the second key structure 160 on the same horizontal plane before being pressed, which is not limited herein. In one embodiment, the first key structure 140 and the second key structure 160 are the same type of key structure but different heights before pressing. For example, the first key structure 140 and the second key structure 160 are the scissor switches with different heights.

Figure 4:
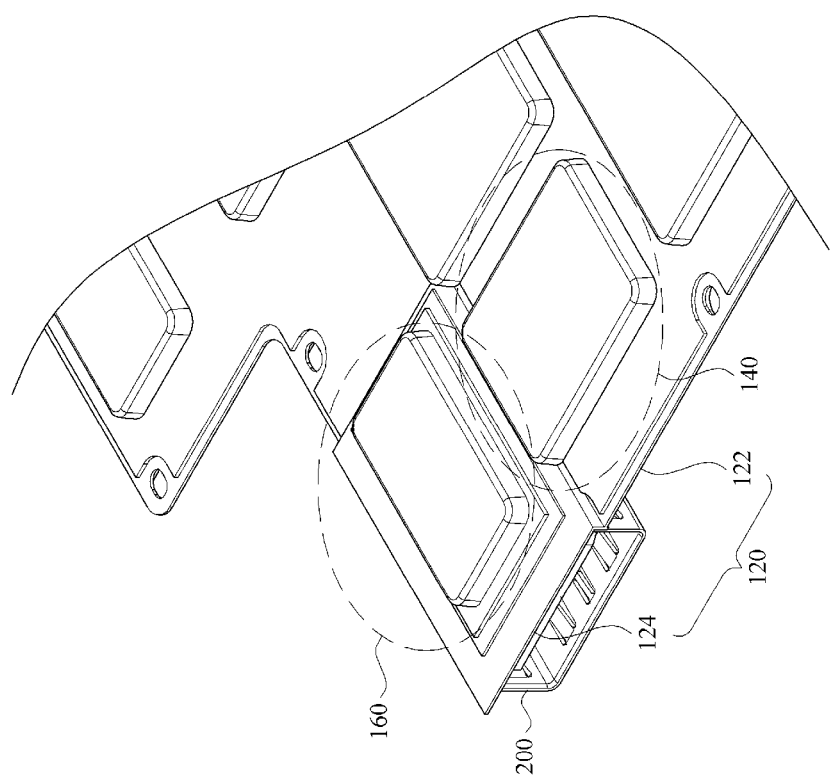
FIG. 4 is a schematic diagram using an accommodating space under a convex area to accommodate a connecting port in an embodiment.

Please refer to FIG. 4 together. In an embodiment, FIG. 4 is a schematic diagram using the accommodating space Si under the convex area 124 to accommodate the connecting port in an embodiment. In the figure, a universal serial port (USB) connecting port 200 is taken as an example, but which is not limited herein. According to the requirement of the space configurations of the electronic device, the accommodating space Si under the convex area 124 also accommodates other types of the connecting port (such as the connecting port for audio and the connecting port displayed) or other parts with higher height.

For notebook computers, stacking components with high height such as connecting ports in the accommodating space Si under the convex area 124 effectively decreases the overall thickness of the host, and decreases the reserved space outside the keyboard module 100 originally reserved for the connecting port and other parts. In addition, under a fixed width of the host, the size of the keyboard module 100 is ensured, to prevent the reduction of the keyboard size from affecting the user's operating experience.

The bottom plate 120 of the keyboard module 100 provided herein includes a second area (the convex area 124), and an accommodating space Si is formed under the second area to accommodate the connecting ports of the electronic device or other parts. In this way, the internal space of the electronic device is effectively used. In addition, by stacking high-height parts such as the USB connecting ports 200 under the keyboard module 100, it helps the electronic device to be thinner and lighter, while ensuring the size of the keyboard for convenience.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A keyboard module, adapted for an electronic device, the keyboard module comprising:
   a bottom plate, comprising a first area and a second area;
   a flexible circuit layer, covering the first area and the second area;
   a first key structure, arranged at a position of the flexible circuit layer corresponding to the first area; and
   a second key structure, arranged at a position of the flexible circuit layer corresponding to the second area, the second key structure comprising a metal dome;
   wherein, a height of the first key structure is greater than a height of the second key structure,
   wherein a keycap surface of the first key structure and that of the second key structure are at a same horizontal plane, and
   wherein the bottom plate and the metal dome of the second key structure are integrally formed on a same metal sheet.

2. The keyboard module according to claim 1, wherein, the first key structure is a scissor switch.

3. The keyboard module according to claim 1, wherein, the first key structure comprises a base, a scissor structure, an elastic element and a first keycap, and the second key structure further comprises a spacer layer and a second keycap.

4. The keyboard module according to claim 3, wherein, the base and the metal dome are integrally formed.

5. The keyboard module according to claim 3, wherein, the base and the bottom plate are integrally formed.

6. The keyboard module according to claim 1, wherein, a type of the second key structure is different from a type of the first key structure.

7. The keyboard module according to claim 1, wherein, the second area is located at an edge of the bottom plate.

8. The keyboard module according to claim 1, wherein, an accommodating space is formed under the second area to accommodate a connecting port of the electronic device.

9. An electronic device, comprising:
a keyboard module, comprising:
a bottom plate, comprising a first area and a second area, and an accommodating space being formed under the second area;
a flexible circuit layer, covering the first area and the second area;
a first key structure, arranged at a position of the flexible circuit layer corresponding to the first area; and
a second key structure, arranged at a position of the flexible circuit layer corresponding to the second area, and a height of the first key structure being greater than a height of the second key structure, the second key structure comprising a metal dome; and
a connecting port, disposed in the accommodating space,
wherein a keycap surface of the first key structure and that of the second key structure are at a same horizontal plane, and
wherein the bottom plate and the metal dome of the second key structure are integrally formed on a same metal sheet.

* * * * *